US010240539B2

(12) United States Patent
Nishimoto et al.

(10) Patent No.: US 10,240,539 B2
(45) Date of Patent: Mar. 26, 2019

(54) HYDRAULIC CONTROL SYSTEM FOR ENGINE

(71) Applicant: MAZDA MOTOR CORPORATION, Hiroshima (JP)

(72) Inventors: Toshiaki Nishimoto, Hiroshima (JP); Masanori Hashimoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/676,240

(22) Filed: Aug. 14, 2017

(65) Prior Publication Data

US 2018/0058344 A1 Mar. 1, 2018

(30) Foreign Application Priority Data

Aug. 24, 2016 (JP) ................. 2016-163852

(51) Int. Cl.
*F02D 13/06* (2006.01)
*F01L 1/34* (2006.01)
(Continued)

(52) U.S. Cl.
CPC .......... *F02D 13/06* (2013.01); *F01L 1/2405* (2013.01); *F01L 1/3442* (2013.01); *F01L 13/0005* (2013.01); *F01L 1/185* (2013.01); *F01L 2001/0537* (2013.01); *F01L 2001/3443* (2013.01); *F01L 2001/34423* (2013.01); *F01L 2001/34426* (2013.01); *F01L 2013/001* (2013.01); *F01L 2810/02* (2013.01); *F01L 2820/01* (2013.01); *F02D 41/0087* (2013.01); *F02D 2041/0012* (2013.01);
(Continued)

(58) Field of Classification Search
CPC ................. F02D 13/06; F02D 41/0087; F02D 2200/024; F02D 2200/023; F02D 2041/1431; F02D 2041/0012; F01L 1/2405; F01L 1/3442; F01L 13/0005; F01L 2001/34426; F01L 2820/01; F01L 2810/02; F01L 2013/001; F01L 2001/3443; F01L 2001/34423; F01L 2001/0537; F01L 1/185
See application file for complete search history.

(56) References Cited

U.S. PATENT DOCUMENTS

2010/0122571 A1* 5/2010 Han ................. F01M 11/10
  73/54.01
2013/0233265 A1* 9/2013 Zurface ............... F01L 13/0036
  123/90.46

FOREIGN PATENT DOCUMENTS

JP 2004-239209 A 8/2004
JP 2011-256724 A 12/2011
JP 2015-194132 A 11/2015

* cited by examiner

*Primary Examiner* — Mark A Laurenzi
*Assistant Examiner* — Wesley G Harris
(74) *Attorney, Agent, or Firm* — Studebaker & Brackett PC

(57) ABSTRACT

A hydraulic control system for an engine having a plurality of cylinders includes: valve stop mechanisms that switch the engine from all-cylinder operation to cylinder cut-off operation; a VVT that can change the timing to open and close valves 14 during all-cylinder operation and cylinder cut-off operation; an oil pump that supplies oil to hydraulically operated devices including the valve stop mechanisms and the VVT through a hydraulic path; and a control device. The control device controls a maintaining oil pressure, which is required to maintain the operated state of the valve stop mechanisms during cylinder cut-off operation, so that the maintaining oil pressure is set to a high value in a high oil viscosity region.

4 Claims, 11 Drawing Sheets

(51) Int. Cl.
*F01L 1/24* (2006.01)
*F01L 13/00* (2006.01)
*F02D 41/00* (2006.01)
*F01L 1/18* (2006.01)
*F01L 1/344* (2006.01)
*F01L 1/053* (2006.01)
*F02D 41/14* (2006.01)

(52) U.S. Cl.
CPC ................ *F02D 2041/1431* (2013.01); *F02D 2200/023* (2013.01); *F02D 2200/024* (2013.01); *Y02T 10/18* (2013.01)

FIG.5

| OPERATING STATE | ROTATIONAL SPEED | LOAD | OIL TEMPERATURE | 500 | 1000 | 1500 | 2000 | 3000 | 4000 | 5000 | 6000 |
|---|---|---|---|---|---|---|---|---|---|---|---|
| – | – | – | Ta1 | 70 | 150 | 150 | 150 | 150 | 150 | 150 | 240 |
| | | | Ta2 | 50 | 110 | 150 | 150 | 150 | 150 | 150 | 240 |
| | | | Ta3 | 35 | 80 | 100 | 150 | 150 | 150 | 150 | 240 |

FIG.6

| OPERATING STATE | ROTATIONAL SPEED | LOAD | OIL TEMPERATURE | 500 | 700 |
|---|---|---|---|---|---|
| ·VEHICLE SPEED IS S0 OR LESS ·THROTTLE IS FULLY CLOSED | – | – | Tb1 | 70 | 70 |
| | | | Tb2 | 80 | 80 |
| | | | Tb3 | 90 | 90 |
| | | | Tb4 | 100 | 100 |

FIG.7

| OPERATING STATE | ROTATIONAL SPEED | LOAD | OIL TEMPERATURE | – |
|---|---|---|---|---|
| – | Va1 OR LESS | P1 OR MORE | – | 350 |
| | Va2 OR MORE | P2 OR MORE | | |
| | Va3 OR MORE | – | | |
| | Va4 OR MORE | P3 OR MORE | | |

FIG.8

| OPERATING STATE | ROTATIONAL SPEED | LOAD | OIL TEMPERATURE | 500 | 1000 | 1500 | 2000 | 3000 | 4000 | 5000 | 6000 |
|---|---|---|---|---|---|---|---|---|---|---|---|
| – | – | – | Tc1 | 35 | 45 | 65 | 85 | 130 | 150 | 150 | 150 |
| | | | Tc2 | ╳ | | 80 | 100 | 150 | 170 | 170 | 170 |
| | | | Tc3 | | | 110 | 130 | 170 | 200 | 200 | 200 |

HYDRAULIC CONTROL SYSTEM FOR ENGINE

CROSS-REFERENCE TO RELATED APPLICATION

This application claims priority to Japanese Patent Application No. 2016-163852 filed on Aug. 24, 2016, the entire disclosure of which is incorporated by reference herein.

BACKGROUND

The present disclosure relates to hydraulic control systems for engines having a variable valve timing mechanism and a valve stop mechanism both of which are operated hydraulically.

Such a hydraulic control system for an engine is disclosed in, e.g., Japanese Unexamined Patent Publication No. 2015-194132.

Engines are provided with many hydraulically operated devices such as a variable valve timing mechanism (VVT) and a valve stop mechanism. Pressurized oil is usually supplied from an oil pump to the hydraulically operated devices via a hydraulic path adjusted to a predetermined oil pressure (target oil pressure).

Cylinder cut-off operation is performed by operation of the valve stop mechanism. In order to maintain the operated state of the valve stop mechanism, an oil pressure (maintaining oil pressure) required to maintain the operated state of the valve stop mechanism need be ensured for the valve stop mechanism. Since fuel efficiency decreases with an increase in target oil pressure, the target oil pressure is recently often adjusted to a minimum required value in order to restrain a decrease in fuel efficiency.

When the VVT is operated during cylinder cut-off operation, oil is supplied to the VVT. This temporarily increases oil consumption and causes reduction in oil pressure, which makes it difficult to ensure the maintaining oil pressure.

The invention of Japanese Unexamined Patent Publication No. 2015-194132 provides a solution to this problem in view of the fact that such reduction in oil pressure increases in proportion to the operating speed of the VVT. Specifically, when the VVT is operated during cylinder cut-off operation, the operating speed of the VVT is limited to ensure the maintaining oil pressure.

SUMMARY

In the invention of Japanese Unexamined Patent Publication No. 2015-194132, a decrease in fuel efficiency can be restrained because the target oil pressure can be adjusted to a low value. However, limiting the operating speed of the VVT may adversely affect operational performance during cylinder cut-off operation.

It is possible to adjust the target oil pressure without limiting the operating speed of the VVT. Namely, the target oil pressure may be adjusted in view of the reduction in oil pressure which is caused by the operation of the VVT. In this case, however, the target oil pressure need be set to a higher value so that the maintaining oil pressure can be stably ensured. A decrease in fuel efficiency therefore cannot be avoided.

It is an object of the present disclosure to provide a hydraulic control system for an engine which can stably ensure a maintaining oil pressure without limiting the operating speed of a VVT even when a valve stop mechanism is operated during cylinder cut-off operation, while avoiding an excessive decrease in fuel efficiency.

The disclosed technique relates to a hydraulic control system for an engine having a plurality of cylinders.

The hydraulic control system includes: a valve stop mechanism that switches the engine from all-cylinder operation to cylinder cut-off operation when pressurized oil is supplied to the valve stop mechanism, the all-cylinder operation being an operation in which all of the cylinders are operated, and the cylinder cut-off operation being an operation in which a part of the cylinders is stopped; a variable valve timing mechanism having an advance chamber and a retard chamber, which are defined by a housing that rotates according to rotation of a crankshaft and a vane body that rotates with the camshaft and which change a phase angle of the camshaft with respect to the crankshaft when the pressurized oil is supplied to the advance chamber and the retard chamber, the variable valve timing mechanism being capable of changing a timing to open and close valves mounted in the cylinders during the all-cylinder operation and the cylinder cut-off operation; an oil pump that supplies the oil to hydraulically operated devices including the variable valve timing mechanism and the valve stop mechanism through a hydraulic path; and a control device that controls operation of the hydraulically operated devices and the oil pump. The control device controls a maintaining oil pressure, which is required to maintain an operated state of the valve stop mechanism during the cylinder cut-off operation, so that the maintaining oil pressure is set to a high value in a high oil viscosity region.

This hydraulic control system includes the valve stop mechanism and the variable valve timing mechanism which are operated hydraulically. There is a case where the variable valve timing mechanism is operated during the cylinder cut-off operation in response to a request to change the timing to open and close the valves mounted in the cylinders. In this case, the pressurized oil is supplied to the advance chamber and the retard chamber of the variable valve timing mechanism. This increases oil consumption and causes reduction in oil pressure in the hydraulic path. The maintaining oil pressure therefore may not be able to be ensured.

It is also possible to apply an oil pressure adjusted in view of the reduction in oil pressure. However, as the viscosity of oil increases, pressure loss increases and hydraulic control of the variable valve timing mechanism becomes less responsive. Accordingly, the oil pressure may not be able to be temporarily ensured if the oil pressure is adjusted by using a target oil pressure that is set to a minimum required value in view of the reduction in oil pressure.

In the above hydraulic control system, however, the maintaining oil pressure, which is required to maintain the operated state of the valve stop mechanism during the cylinder cut-off operation, is controlled so that the maintaining oil pressure is set to a high value in the high oil viscosity region. Accordingly, the maintaining oil pressure can be stably ensured even if the oil pressure is adjusted by using the target oil pressure that is set to a minimum required value in view of the reduction in oil pressure. According to the above hydraulic control system, the cylinder cut-off operation and the operation of the variable valve timing mechanism can thus be stably performed while restraining a decrease in fuel efficiency.

The control device may control a transient oil pressure, which is required for operation of the valve stop mechanism when switching the engine from the all-cylinder operation to the cylinder cut-off operation, so that the transient oil pressure is set to a high value in the high oil viscosity region, and may change the transient oil pressure according to a rotational speed of the engine.

With this configuration, when the engine is switched from the all-cylinder operation to the cylinder cut-off operation, the cylinder cut-off operation and the operation of the variable valve timing mechanism can be stably performed while restraining a decrease in fuel efficiency.

The oil pump may be a variable oil pump whose discharge amount can be adjusted. The hydraulic control system may further include: an oil pressure sensor mounted in the hydraulic path; and a discharge amount adjusting device that adjusts the discharge amount of the variable oil pump based on an oil pressure detected by the oil pressure sensor. The control device may control the discharge amount adjusting device to adjust the maintaining oil pressure and the transient oil pressure.

With this configuration, the maintaining oil pressure and the transient oil pressure can be accurately adjusted without using a complicated mechanism, and the variable oil pump can be driven with appropriate efficiency according to the operating state of the engine.

According to the disclosed hydraulic control system for the engine, the cylinder cut-off operation and the operation of the VVT can be stably performed while restraining a decrease in fuel efficiency.

BRIEF DESCRIPTION OF THE DRAWINGS

FIG. 5 shows a map of a base oil pressure.

FIG. 6 shows a map of a required oil pressure at the time improved lubrication is requested.

FIG. 7 shows a map of a required oil pressure for oil jets.

FIG. 8 shows a map of a required oil pressure for an exhaust-side VVT.

DETAILED DESCRIPTION

Figure 1:
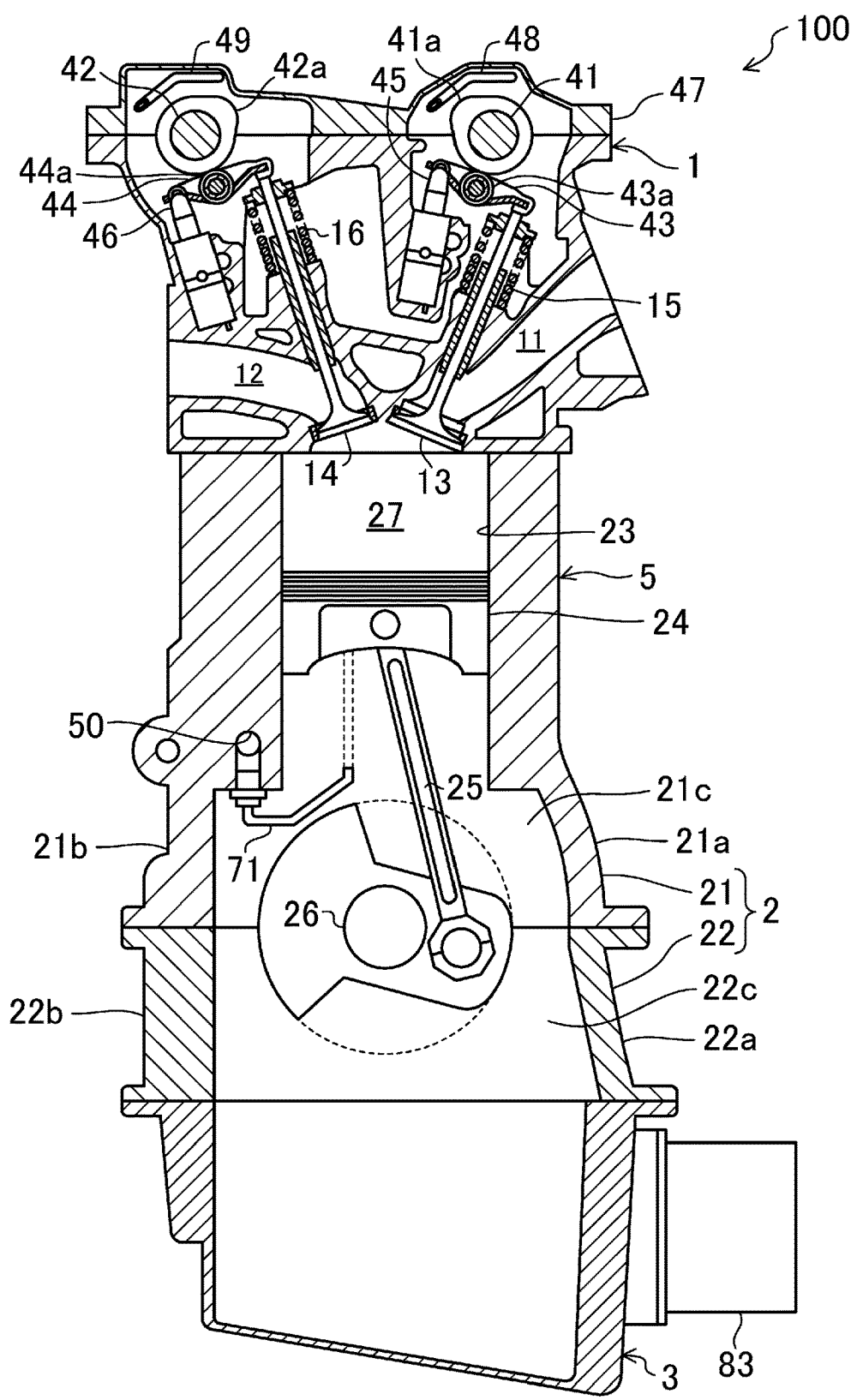
FIG. 1 is a schematic sectional view of an engine taken along a plane including the axes of cylinders.

An exemplary embodiment will be described with reference to the accompanying drawings.
[Engine]
FIG. 1 is a schematic sectional view of an engine 100. The engine 100 is an inline four-cylinder engine that is mounted on automobiles. The engine 400 has four cylinders mounted therein in a straight line in a cylinder bank direction (in FIG. 1, the direction perpendicular to the plane of paper) (the four cylinders are hereinafter sometimes referred to as the first cylinder, the second cylinder, the third cylinder, and the fourth cylinder from one end). The engine 100 switches between two operations according to the operating state of the engine 100 in order to restrain a decrease in fuel efficiency etc. One of the two operations is an operation in which all the cylinders are operated (all-cylinder operation), and the other operation is an operation in which a part of the cylinders, such as half of the cylinders, is stopped (cylinder cut-off operation).

The engine 100 includes a cylinder head 1, a cylinder block 2 attached to the lower side of the cylinder head 1, and an oil pan 3 attached to the lower side of the cylinder block 2. The cylinder block 2 has an upper block 21 and a lower block 22. The lower block 22 is attached to the lower surface of the upper block 21. The oil pan 3 is attached to the lower surface of the lower brock 22.

The upper block 21 has four cylindrical cylinder bores 23 extending in the vertical direction (FIG. 1 shows only one of the cylinder bores 23). The four cylinder bores 23 form the four cylinders. The cylinder head 1 is placed on the upper block 21 so as to close the upper openings of the cylinder bores 23. A piston 24 is placed in each cylinder bore 23 such that the piston 24 can slide in the vertical direction. Each piston 24 is coupled via a connecting rod 25 to a crankshaft 26 located below the piston 24. Combustion chambers 27 are defined in the engine 100. Each combustion chamber 27 is defined by the inner peripheral wall of the cylinder bore 23, the upper surface of the piston 24, and the lower wall of the cylinder head 1 which faces the cylinder bore 23.

The cylinder head 1 has intake ports 11 and exhaust ports 12, each having an opening in the upper part of a corresponding one of the combustion chambers 27. Each intake port 11 has mounted therein an intake valve 13 that opens and closes the opening of the intake port 11. Each exhaust port 12 has mounted therein an exhaust valve 14 that opens and closes the opening of the exhaust port 12. Each intake valve 13 is driven by a corresponding one of intake cam portions 41a on an intake camshaft 41, and each exhaust valve 14 is driven by a corresponding one of exhaust cam portions 42a on an exhaust camshaft 42.

Specifically, the intake valve 13 and the exhaust valve 14 are biased by valve springs 15, 16 in the direction in which the intake valve 13 and the exhaust valve 14 close the openings of the intake port 11 and the exhaust port 12 (upward in FIG. 1), respectively. An intake swing arm 43 having a cam follower 43a substantially in the middle is placed between the intake valve 13 and the intake cam portion 41a, and an exhaust swing arm 44 having a cam follower 44a substantially in the middle is placed between the exhaust valve 14 and the exhaust cam portion 42a.

The intake swing arm 43 is supported at its one end by a hydraulic lash adjuster (HLA) 45, and the exhaust swing arm 44 is supported at its one end by an HLA 46. As the cam follower 43 or 44 is pressed by the intake cam portion 41a or the exhaust cam portion 42a, the intake swing arm 43 or the exhaust swing arm 44 swings such that its one end supported by the HLA 45 or 46 serves as a fulcrum. When the intake swing arm 43 or the exhaust swing arm 44 swings, the other end of the intake swing arm 43 or the exhaust swing arm 44 depresses the intake valve 13 or the exhaust valve 14 against the biasing force of the valve spring 15 or 16, so that the intake valve 13 or the exhaust valve 14 moves in the direction in which the intake valve 13 or the exhaust valve 14 opens the opening of the intake port 11 or the exhaust port 12 (downward in FIG. 1). The HLAs 45, 46 are automatically hydraulically adjusted so that valve clearance becomes equal to zero.

The HLAs 45, 46 for the first and fourth cylinders include valve stop mechanisms 45d, 46d, respectively. The valve stop mechanism 45d stops operation of the intake valve 13, and the valve stop mechanism 46d stops operation of the exhaust valve 14 (this will be described in detail later). The HLAs 45, 46 for the second and fourth cylinders do not include the valve stop mechanisms 45d, 46d (hereinafter the HLAs 45, 46 that include the valve stop mechanisms 45d, 46d are also referred to as the sophisticated HLAs 45a, 46a, and the HLAs 45, 46 that do not include the valve stop mechanisms 45b, 46b are also referred to as the standard HLAs 45a, 46a).

The engine 100 is switched between all-cylinder operation and cylinder cut-off operation by operation of the sophisticated HLAs 45a, 46a (this will be described in detail later). That is, pressurized oil is supplied to the sophisticated HLAs 45a, 46a through oil supply passages (formed in the cylinder head 1) communicating with the sophisticated HLAs 45a, 46a, whereby the sophisticated HLAs 45a, 46a are hydraulically controlled and the engine 100 is switched between all-cylinder operation and cylinder cut-off operation.

[Valve Stop Mechanism]

Figure 2C:
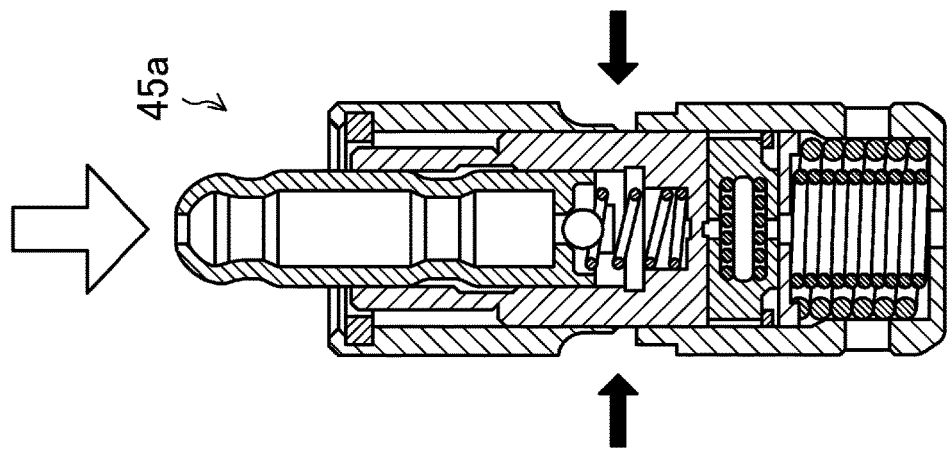
FIG. 2C is a sectional view showing the configuration and operation of the valve stop mechanism and showing the valve stop mechanism in a stopped state.
Figure 2B:
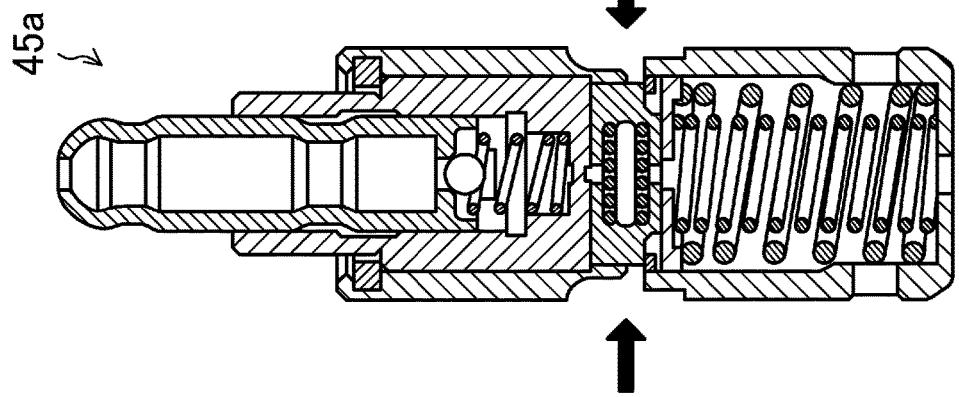
FIG. 2B is a sectional view showing the configuration and operation of the valve stop mechanism and showing the valve stop mechanism in an unlocked state.
Figure 2A:
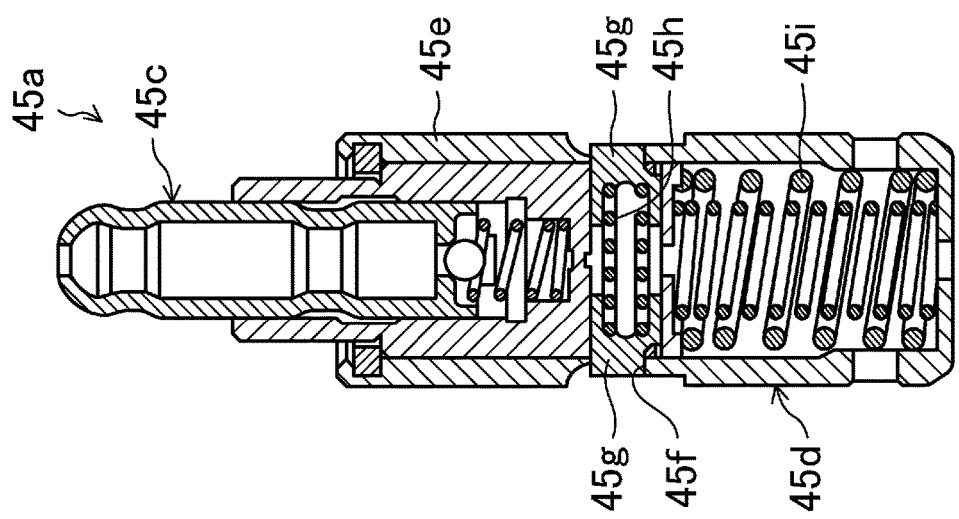
FIG. 2A is a sectional view showing the configuration and operation of a valve stop mechanism and showing the valve stop mechanism in a locked state.

FIGS. 2A to 2C show the sophisticated HLA 45a. Since the structure of the sophisticated HLA 45a is substantially the same as that of the standard HLAs 45b, 46b except for the valve stop mechanism 45d, the sophisticated HLA 45a will be described below.

The sophisticated HLA 45a has a pivot mechanism 45c and the valve stop mechanism 45d. The pivot mechanism 45c is a well-known pivot mechanism for HLAs and automatically hydraulically adjusts valve clearance to zero. The valve stop mechanism 45d is a mechanism that switches a corresponding one of the intake valves 13 or the exhaust valves 14 between the operated state and the stopped state.

As shown in FIG. 2A, the valve stop mechanism 45d has a bottomed cylindrical outer casing 45e, a pair of lock pins 45g, a lock spring 45h, and a lost motion spring 45i. The outer casing 45e accommodates the pivot mechanism 45c such that the pivot mechanism 45c can slide in the axial direction and project beyond the outer casing 45e. The outer casing 45e has two through holes 45f formed in its side surface so as to face each other. The pair of lock pins 45g are inserted through the through holes 45f such that the lock pins 45g can advance into and withdraw from the through holes 45f. The lock spring 45h biases each lock pin 45g outward in the radial direction of the outer casing 45e. The lost motion spring 45i is accommodated in the bottom part of the outer casing 45e and biases the pivot mechanism 45c in such a direction that the pivot mechanism 45c projects beyond the outer casing 45e.

The lock pins 45g are placed at the lower end of the pivot mechanism 45c. The lock pins 45g are hydraulically operated to switch the valve stop mechanism 45d between the locked state and the unlocked state. The locked state is the state where the pivot mechanism 45c is fixed and is not allowed to be displaced. The unlocked state is the state where the pivot mechanism 45c is allowed to slide and be displaced in the axial direction.

FIG. 2A shows the locked state. In the locked state, the pivot mechanism 45c projects beyond the outer casing 45e by a relatively large amount, and the lock pins 45g are fitted in the through holes 45f, whereby axial movement of the outer casing 45e is restricted. In the locked state, the top of the pivot mechanism 45c contacts the one end of the intake swing arm 43 or the exhaust swing arm 44 and functions as a fulcrum of the swinging motion of the intake swing arm 43 or the exhaust swing arm 44.

That is, when the valve stop mechanism 45d is in the locked state, the sophisticated HLA 45a is substantially the same as the standard HLAs 45b, 46b, and the intake valve 13 or the exhaust valve 14 corresponding to the sophisticated HLA 45a operates as usual.

When pressured oil is supplied to the sophisticated HLA 45a and a predetermined oil pressure is applied to the lock pins 45g as shown by black arrows in FIG. 2B, the lock pins 45g are moved inward in the radial direction against the biasing force of the lock spring 45h and disengaged from the through holes 45f. Each lock pin 45g is thus withdrawn into the outer casing 45e to such a position that the lock pin 45g does not fit in the through hole 45f. Namely, the valve stop mechanism 45d is switched to the unlocked state.

Since the pivot mechanism 45c is biased by the lost motion spring 45i, the pivot mechanism 45c projects beyond the outer casing 45e by a relatively large amount. However, the biasing force of the lost motion spring 45i is set to a value smaller than the biasing force of the valve spring 15, 16 that biases the intake valve 13 or the exhaust valve 14 in such a direction that the intake valve 13 or the exhaust valve 14 is closed. Accordingly, in the unlocked state, when the cam follower 43a, 44a is pressed by the intake cam portion 41a or the exhaust cam portion 42a, the intake swing arm 43 or the exhaust swing arm 44 swings with the top of the intake valve 13 or the exhaust valve 14 serving as a fulcrum, whereby the pivot mechanism 45c is displaced toward the bottom of the outer casing 45e against the biasing force of the lost motion spring 45i, as shown by a white arrow in FIG. 2C.

That is, when the valve stop mechanism 45d is in the unlocked state, the sophisticated HLA 45a does not function as an HLA, and operation of a corresponding one of the intake valves 13 or the exhaust valves 14 is stopped. The cylinder having the intake valve 13 or the exhaust valve 14 therefore cannot operate and is thus stopped. The engine 100 is thus switched to cylinder cut-off operation. The unlocked state of the valve stop mechanism 45d is maintained during the cylinder cut-off operation.

A cam cap 47 is attached to the upper side of the cylinder head 1. The cylinder head 1 and the cam cap 47 rotatably support the intake camshaft 41 and the exhaust camshaft 42.

Intake-side oil showers 48 are mounted above the intake camshaft 41, and exhaust-side oil showers 49 are mounted above the exhaust camshaft 42. The intake-side oil showers 48 and the exhaust-side oil showers 49 drop oil to those parts of the inlet cam portions 41a and the exhaust cam portions 42a which contact the cam followers 43a, 44a of the intake swing arms 43 and the exhaust swing arms 44.

[Variable Valve Timing Mechanism (VVT)]

The engine 100 is provided with a variable valve timing mechanism (VVT) that changes valve characteristics of the intake valves 13 and the exhaust valves 14. In the case of this engine 100, an intake-side VVT is an electrically driven VVT, and an exhaust-side VVT 18 is a hydraulically driven VVT.

Figure 3:
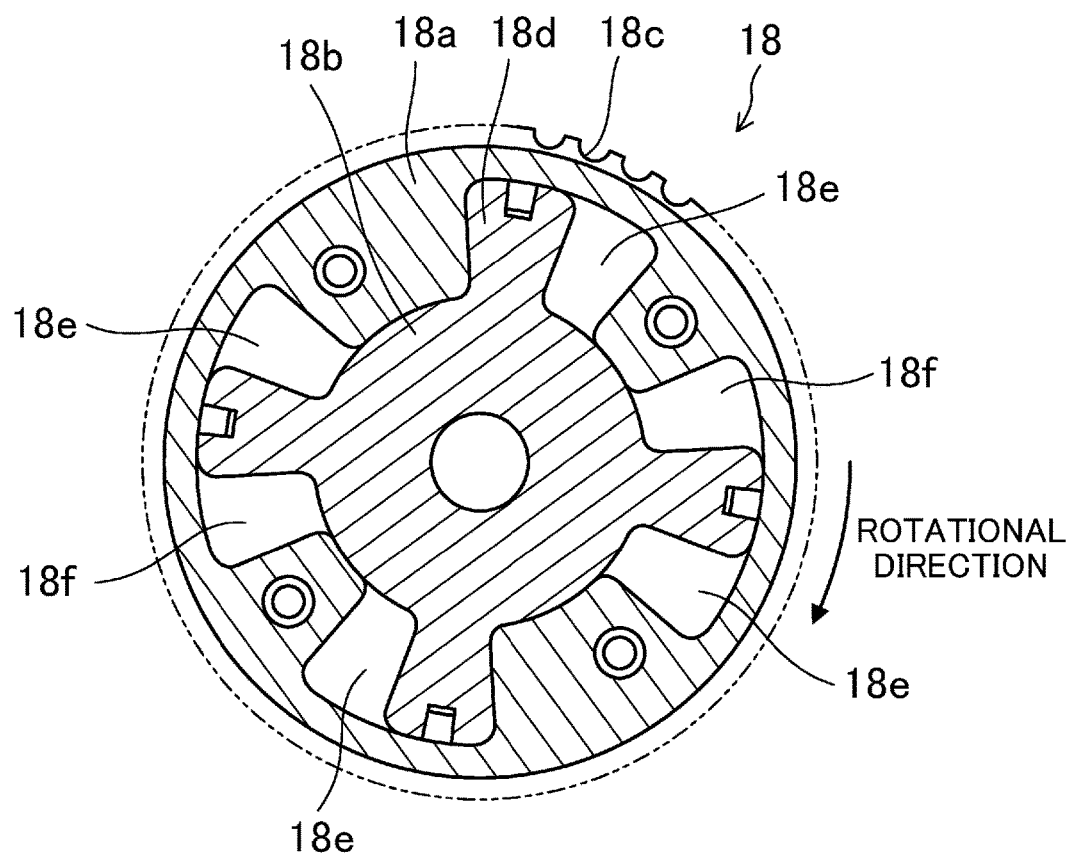
FIG. 3 is a sectional view schematically showing the configuration of a variable timing mechanism.

FIG. 3 shows the exhaust-side VVT 18. The exhaust-side VVT 18 has a substantially annular housing 18a and a rotor 18b accommodated in the housing 18a. The housing 18a is integral with a cam pulley 18c that rotates according to rotation of the crankshaft 26. The rotor 18b is integral with the exhaust camshaft 42 that opens and closes the exhaust valves 14.

The rotor 18b has a plurality of vane bodies 18d in its outer periphery. The vane bodies 18d are formed in a radial pattern so as to project outward in the radial direction. The housing 18a has a plurality of spaces therein in order to accommodate the vane bodies 18d. These spaces are partitioned by the vane bodies 18d, forming a plurality of retard chambers 18e and a plurality of advance chambers 18f in the housing 18a.

Pressurized oil is supplied to the retard chambers 18e and the advance chambers 18f in order to change the timing to open and close the exhaust valves 14. When the oil pressure in the retard chambers 18e becomes higher than the oil pressure in the advance chambers 18f, the rotor 18b rotates in the opposite direction that the housing 18a rotates. That is, the exhaust camshaft 42 rotates in the opposite direction that the cam pulley 18c rotates. The phase angle of the exhaust camshaft 42 with respect to the crankshaft 26 is thus retarded, whereby the timing to open the exhaust valves 14 is retarded.

When the oil pressure in the advance chambers 18f becomes higher than the oil pressure in the retard chambers 18e, the rotor 18b rotates in the same direction as the direction in which the housing 18a rotates. That is, the exhaust camshaft 42 rotates in the same direction as the direction in which the cam pulley 18c rotates. The phase angle of the exhaust camshaft 42 with respect to the crankshaft 26 is thus advanced, whereby the timing to open the exhaust valves 14 is advanced.

Since the timing to open the exhaust valves 14 and the intake valves 13 is changed by the exhaust-side VVT 18 or the intake-side VVT in this manner, the amount by which the open period of the intake valves 13 overlaps the open period of the exhaust valves 14 can be controlled, which can improve fuel efficiency performance due to increased internal exhaust gas recirculation (EGR), reduced pumping loss, etc. Control of changing the valve opening timing by the exhaust-side VVT 18 and the intake-side VVT is performed in both all-cylinder operation and cylinder cut-off operation.

[Hydraulic Control System]

Figure 4:
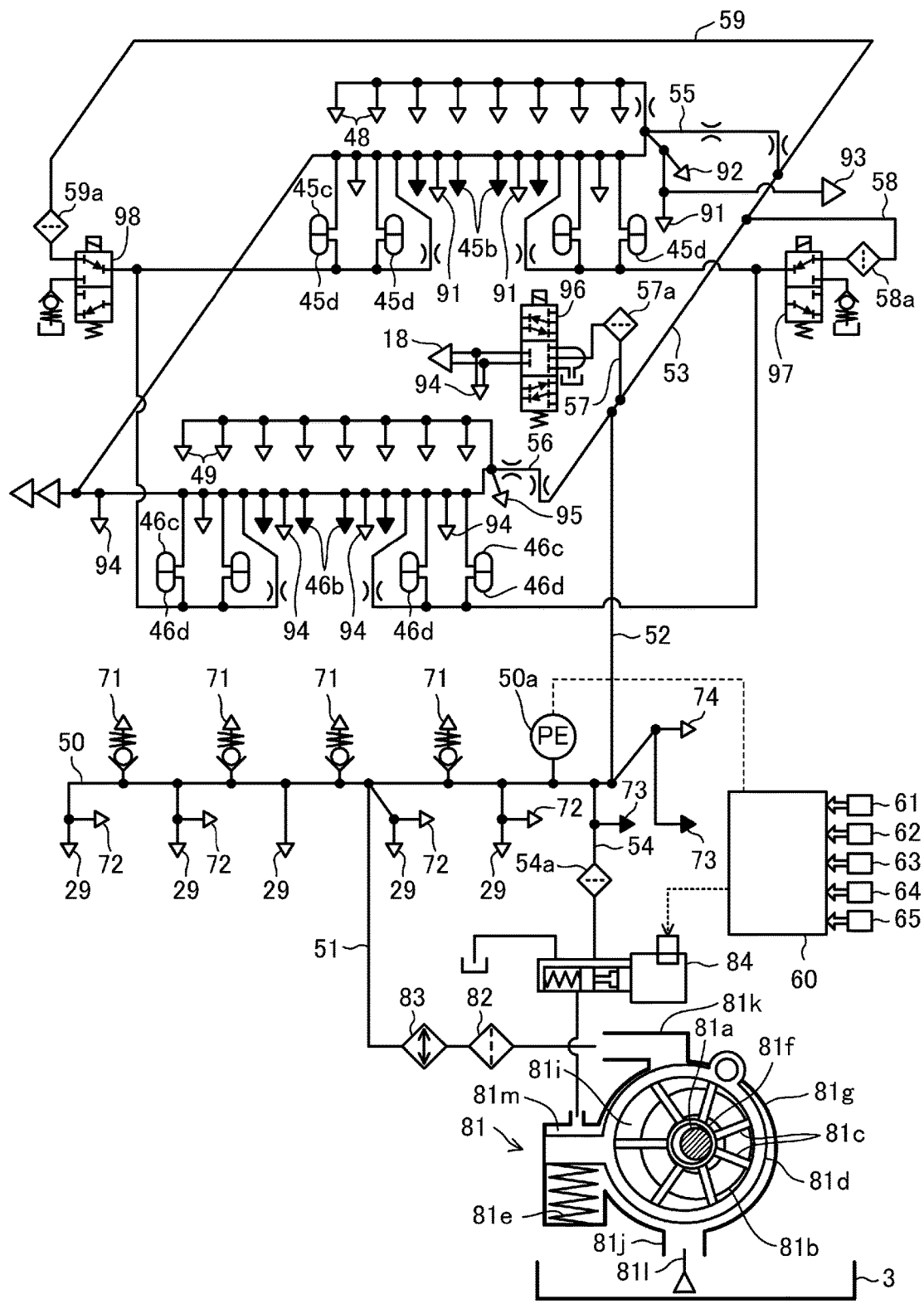
FIG. 4 is a circuit diagram of a hydraulic control system.

FIG. 4 is a circuit diagram of a hydraulic control system of the engine 100.

The hydraulic control system is a system that supplies oil of a predetermined pressure to hydraulically operated devices (devices that are operated by an oil pressure) provided for the engine 100 such as the HLAs 45, 46 and the exhaust-side VVT 18 and to those parts of the engine 100 which are to be lubricated such as bearing portions. The hydraulic control system is formed by the hydraulically operated devices, a hydraulic path, an oil pump 81, a controller 60 (control device), etc.

(Oil Pump)

The oil pump 81 is a known variable displacement oil pump whose discharge amount can be adjusted. The oil pump 81 is attached to the lower surface of the lower block 22. The oil pump 81 is driven by the crankshaft 26 to supply oil to each hydraulically operated device through the hydraulic path.

Specifically, the oil pump 81 includes a drive shaft 81a, a rotor 81b, a plurality of vanes 81c, a cam ring 81d, a spring 81e, a ring member 81f, and a housing 81g. The rotor 81b is coupled to the drive shaft 81a. The vanes 81c are arranged such that the vanes 81c can advance and withdraw with respect to the rotor 81b in the radial direction. The cam ring 81d accommodates the rotor 81b and the vanes 81c and is configured so that its offset with respect to the rotation center of the rotor 81b can be adjusted. The spring 81e biases the cam ring 81d in such a direction that the offset of the cam ring 81d with respect to the rotation center of the rotor 81b is increased. The ring member 81f is placed inside the rotor 81b. The housing 81g accommodates the rotor 81b, the vanes 81c, the cam ring 81d, the spring 81e, and the ring member 81f.

Although not shown in the figure, a driven sprocket is coupled to one end of the drive shaft 81a which projects outward beyond the housing 81b. A timing chain wound around a drive sprocket of the crankshaft 26 is wound around the driven sprocket. The rotor 81b is thus driven and rotated by the crankshaft 26.

When the rotor 81b is rotated, each vane 81c slides on the inner peripheral surface of the cam ring 81d. A pump chamber (hydraulic oil chamber) 81i is thus defined by the rotor 81b, adjacent two of the vanes 81c, the cam ring 81d, and the housing 81g.

The housing 81g has a suction port 81j through which oil is sucked into the pump chamber 81i, and a discharge port 81k through which oil is discharged from the pump chamber 81i. An oil strainer 81l (immersed in oil stored in the oil pan 3) is connected to the suction port 81j, and the oil stored in the oil pan 3 is sucked into the pump chamber 81i through the suction port 81j via the oil strainer 81l. The discharge port 81k is connected to the hydraulic path, and the oil sucked by the oil pump 81 is discharged into the hydraulic path through the discharge port 81k.

The cam ring 81d is supported by the housing 81g such that the cam ring 81d swings about a predetermined fulcrum. The spring 81e biases the cam ring 81d toward one side in the direction in which the cam ring 81d swings. A pressure chamber 81m is defined between the cam ring 81d and the housing 81g. Oil is supplied to the pressure chamber 81m, and the oil pressure in the pressure chamber 81m biases the cam ring 81d to the other side in the direction in which the cam ring 81d swings. The cam ring 81d thus swings according to the balance between the biasing force of the spring 81e and the oil pressure in the pressure chamber 81m, whereby the offset of the cam ring 81d with respect to the rotation center of the rotor 81d is determined. The capacity of the oil pump 81 changes according to the offset of the cam ring 81d, whereby the discharge amount of oil changes accordingly.

(Hydraulic Path)

The hydraulic path is formed by hydraulic pipes and flow passages formed in the cylinder block 2 etc. The hydraulic path is comprised of a main gallery 50 (see FIG. 1), a control pressure path 54, a first communicating passage 51, a second communicating passage 52, a third communicating passage 53, first to fifth oil supply passages 55 to 59, etc. The main gallery 50 extends in the cylinder bank direction in the cylinder block 2. The control pressure path 54 branches off from the main gallery 50. The first communicating passage 51 connects the oil pump 81 and the main gallery 50. The second communicating passage 52 extends from the main gallery 50 to the cylinder head 1. The third communicating passage 53 extends substantially horizontally between the intake side and the exhaust side in the cylinder head 1. The first to fifth oil supply passages 55 to 59 branch off from the third communicating passage 53.

The first communicating passage 51 is connected to the discharge port 81k of the oil pump 81 and an intermediate part of the main gallery 50. An oil filter 82 and an oil cooler 83 are arranged in the first communicating passage 51 in this order from the oil pump 81 side. Oil discharged from the oil pump 81 into the first communicating passage 51 is thus filtered through the oil filter 82, and the temperature of the filtered oil is adjusted by the oil cooler 83. The resultant oil then flows into the intermediate part of the main gallery 50.

Oil jets 71 are connected to the main gallery 50 at intervals in the cylinder bank direction (see FIG. 1). The oil jets 71 inject oil toward the back surfaces of the four pistons 24. Each oil jet 71 has a check valve and a nozzle. When an oil pressure having a predetermined value or more is applied, the check valve is opened, and the oil jet 71 injects oil from the nozzle.

Branch paths are also connected to the main gallery 50 at intervals in the cylinder branch direction. The branch paths supply oil to five bearing portions 29 supporting the crankshaft 26 and bearing portions 72 in the four connecting rods 25. One end of the main gallery 50 is a terminal end connecting to one of the branch paths. The control pressure path 54, the second communicating path 52, and a branch path having an oil supply portion 73 and an oil jet 74 are connected to the other end of the main gallery 50. The oil supply portion 73 supplies oil to a hydraulic chain tensioner, and the oil jet 74 injects oil to the timing chain.

Oil is always supplied to the main gallery 50, and an oil pressure sensor 50a that detects the pressure of this oil is mounted at the other end of the main gallery 50. The oil pressure in the hydraulic path is controlled based on the detection value of the oil pressure sensor 50a (this will be described in detail later).

The control pressure path 54 is connected to the pressure chamber 81m of the oil pump 81. The oil supply portion 73, an oil filter 54a, and an oil control valve (discharge amount adjusting device) 84 are mounted in the control pressure path 54. After oil passes through the control pressure path 54 and is filtered through the oil filter 54a, the pressure of this oil is adjusted by the oil control valve 84 and the resultant oil then flows into the pressure chamber 81m of the oil pump 81.

That is, the oil pressure in the pressure chamber 81m has been adjusted by the oil control valve 84. The oil control valve 84 is a linear solenoid valve. The oil control valve 84 adjusts the flow rate of the oil to be supplied to the pressure chamber 81m, according to the duty cycle of a received control signal.

The second communicating passage 52 communicates with the third communicating passage 53. Oil in the main gallery 50 thus flows through the second communicating passage 52 into the third communicating passage 53. The oil having flowed into the third communicating passage 53 is distributed through the third communicating passage 53 to the first oil supply passage 55 located on the intake side of the cylinder head 1 and the second oil supply passage 56 located on the exhaust side of the cylinder head 1.

Oil supply portions 91, 92 for the intake camshaft 41, the pivot mechanisms 45c of the sophisticated HLAs 45a, the standard HLAs 45b, the intake-side oil showers 48, and an oil supply portion 93 for a sliding portion of the intake-side VVT are connected to the first oil supply passage 55.

Oil supply portions 94, 95 for the exhaust camshaft 42, the pivot mechanisms 46c of the sophisticated HLAs 46a, the standard HLAs 46b, and the exhaust-side oil showers 49 are connected to the oil supply passage 56.

The third oil supply passage 57 is connected to the exhaust-side VVT 18 (specifically, the regard chambers 18e and the advance chambers 18f) and the oil supply portion 94 for the exhaust camshaft 42 via an oil filter 57a and a first direction control valve 96. The first direction control valve 96 adjusts the amount of oil to be supplied to the regard chambers 18e and the advance chambers 18f.

That is, the first direction control valve 96 controls operation of the exhaust-side VVT 18.

The fourth oil passage 58 is connected to the valve stop mechanisms 45d, 46d of the sophisticated HLAs 45a, 46a for the first cylinder via an oil filter 58a and a second direction control valve 97. The second direction control valve 97 adjusts the amount of oil to be supplied to the valve stop mechanisms 45d, 46d for the first cylinder.

The fifth oil passage 59 is connected to the valve stop mechanisms 45d, 46d of the sophisticated HLAs 45a, 46a for the fourth cylinder via an oil filter 59a and a third direction control valve 98. The third direction control valve 98 adjusts the amount of oil to be supplied to the valve stop mechanisms 45d, 46d for the fourth cylinder.

That is, the second direction control valve 97 controls operation of the valve stop mechanisms 45d, 46d for the first cylinder, and the third direction control valve 98 controls operation of the valve stop mechanisms 45d, 46d for the fourth cylinder.

Oil supplied to each part of the engine 100 is collected by the oil pan 3 through drain oil passages, not shown. The hydraulic control system thus circulates oil and also supplies oil of a predetermined pressure to the hydraulically operated devices and those parts of the engine 100 which are to be lubricated.

Oil flowing in a hydraulic circuit tends to have a lower pressure on the downstream side than on the upstream side due to pressure loss that is caused by frictional resistance etc. The longer the path is, the larger the reduction in oil pressure is. Moreover, the longer the path is, the slower the response of the oil pressure is. Accordingly, the oil pressure required for all of the hydraulically operated devices is not necessarily immediately ensured even if the discharge amount of the oil pump 81 is changed.

The controller 60 has hardware such as a processor and a memory, and software such as a control program and control data, and generally controls the engine 100. The controller 60 receives signals from various sensors that detect the operating state of the engine 100.

For example, the controller 6 receives signals from the hydraulic sensor 50a, a crank angle sensor 61, an airflow sensor 62, an oil temperature sensor 63, a cam angle sensor 64, a water temperature sensor 65, etc. The crank angle sensor 61 detects the rotation angle of the crankshaft 60. The airflow sensor 62 detects the amount of air entering the engine 100. The oil temperature sensor 63 detects the temperature of oil flowing in the hydraulic path. The cam angle sensor 64 detects the rotational phases of the intake camshaft 41 and the exhaust camshaft 42. The water temperature sensor 65 detects the temperature of cooling water for the engine 100.

The controller 60 obtains the engine speed based on the signal from the crank angle sensor 61, obtains an engine load based on the signal from the airflow sensor 62, and obtains the operating angles of the intake-side VVT and the exhaust-side VVT 18 based on the signal of the cam angle sensor 64.

The controller 60 determines the operating state of the engine 100 based on these signals and controls the first direction control valve 96, the second direction control valve 97, the third direction control valve 98, etc. according to the determined operating state.

[Hydraulic Control]

The controller 60 also adjusts the discharge amount of the oil pump 81 by controlling the oil control valve 84. Specifically, the controller 60 controls the oil control valve 84 so that the oil pressure that is detected by the oil pressure sensor 50*a* becomes equal to an oil pressure (target oil pressure) that is set according to the operating state of the engine 100.

First, setting of the target oil pressure will be described.

The hydraulic control system ensures an oil pressure (required oil pressure) required for the plurality of hydraulically operated devices by supplying oil to these hydraulically operated devices by the single oil pump 81. However, the required oil pressure varies among the individual hydraulically operated devices. For example, in this engine 100, the required oil pressures for the exhaust-side VVT 18, the valve stop mechanisms 45*d*, 46*d*, and the oil jets 71 are relatively high. The required oil pressures also change according to the operating state of the engine 100.

Accordingly, in this engine 100, in order to ensure the required oil pressures for all the hydraulically operated devices, it is necessary to set, for each operating state of the engine 100, the target oil pressure to a value equal to or higher than the maximum value of each required oil pressure for the exhaust-side VVT 18, the valve stop mechanisms 45*d*, 46*d*, and the oil jets 71.

There are also required oil pressures for those parts of the engine 100 which are to be lubricated such as the bearing portions, and these required oil pressures also change according to the operating state of the engine 100. Of those parts of the engine 100 which are to be lubricated, the required oil pressure for the bearing portions 29 supporting the crankshaft 26 is relatively high. Accordingly, an oil pressure (base oil pressure) required for those parts of the engine 100 which are to be lubricated is set to an oil pressure slightly higher than this required oil pressure.

The controller 60 sets the target oil pressure to an appropriate value that meets both the required oil pressure for each hydraulically operated device and the base oil pressure. As a result, oil of an appropriate pressure is supplied to the hydraulic control system of the engine 100 and driving of the oil pump 80 is minimized, whereby a decrease in fuel efficiency is restrained.

The base oil pressure and the required oil pressures change according to the operating state of the engine 100, such as the load and the rotational speed of the engine 100 and the oil temperature. The controller 60 therefore stores, in its memory, maps of the base oil pressure and the required oil pressures corresponding to these conditions.

FIG. 5 shows a map of the base oil pressure. In the map, "Operating State," "Rotational Speed," "Load," and "Oil Temperature" in the first row are data elements, and numerals such as "500" on the right side of "Oil Temperature" represent the rotational speed (rpm) of the engine 100. The values of the base oil pressures are shown in kPa.

FIG. 5 shows a simplified map for convenience. The map is usually set in a more detailed manner In the map, the values of the base oil pressure are discretely set according to the rotational speed of the engine 100 etc. The values of the base oil pressure at the rotational speeds etc. that are not set in the map are obtained by linear interpolation of the values of the base oil pressure which are set in the map (the same applies to the maps that will be described below).

As shown in FIG. 5, the base oil pressure is set according to the oil temperature (Ta1>Ta2>Ta3) and the rotational speed of the engine 100. The higher the rotational speed is, the more the bearing portions need be lubricated. The base oil pressure is therefore set so that the base oil pressure increases with an increase in rotational speed. The base oil pressure is set so that the base oil pressure has an approximately constant value when the rotational speed is in a medium rotation region and that the base oil pressure decreases with a decrease in oil temperature when the rotational speed is in a low rotation region.

FIG. 6 shows a map of the required oil pressure at the time improved lubrication is requested. Improved lubrication is requested mainly during idling. In the idle state, the amount of oil mist that is generated tends to decrease, and the connecting rod 25 etc. may not be sufficiently lubricated with the oil mist. Accordingly, improved lubrication is requested to increase the oil pressure so that more oil mist is generated.

Specifically, as shown in FIG. 6, improved lubrication is requested when the "vehicle speed is S0 or less" and the "throttle is fully closed." The required oil pressure is therefore set only when the rotational speed of the engine 100 is relatively low. The required oil pressure at the time improved lubrication is requested is set so that the required oil pressure increases with a decrease in oil pressure (Tb1>Tb2>Tb3>Tb4). This is because, as the oil temperature decreases, oil becomes more viscous and the amount of oil mist that is generated decreases accordingly.

In FIG. 6, the required oil pressure is the same for the differential rotational speeds when the oil temperature is the same. However, the required oil pressure may vary according to the rotational speed. For example, the required oil pressure may be set so that the required oil pressure increases with an increase in rotational speed.

FIG. 7 shows a map of the required oil pressure for the oil jets 71. The operating conditions of the oil jets 71 are defined according to the rotational speed and the load of the engine 100. Since the oil jets 71 inject oil when their check valves are opened, the required oil pressure for the oil jets 71 is constant.

FIG. 8 shows a map of the required oil pressure for the exhaust-side VVT 18. The required oil pressure for the exhaust-side VVT 18 is set according to the oil temperature and the rotational speed of the engine 100. The required oil pressure for the exhaust-side VVT 18 is set so that the required oil pressure increases with an increase in rotational speed of the engine 100 and decreases with a decrease in oil temperature (Tc1<Tc2<Tc3).

Maps of the required oil pressures (maintaining oil pressure and transient oil pressure) for the valve stop mechanisms 45*d*, 46*d* are also stored in the memory. These maps will be described later.

(Specific Example of Hydraulic Control)

Figure 9:
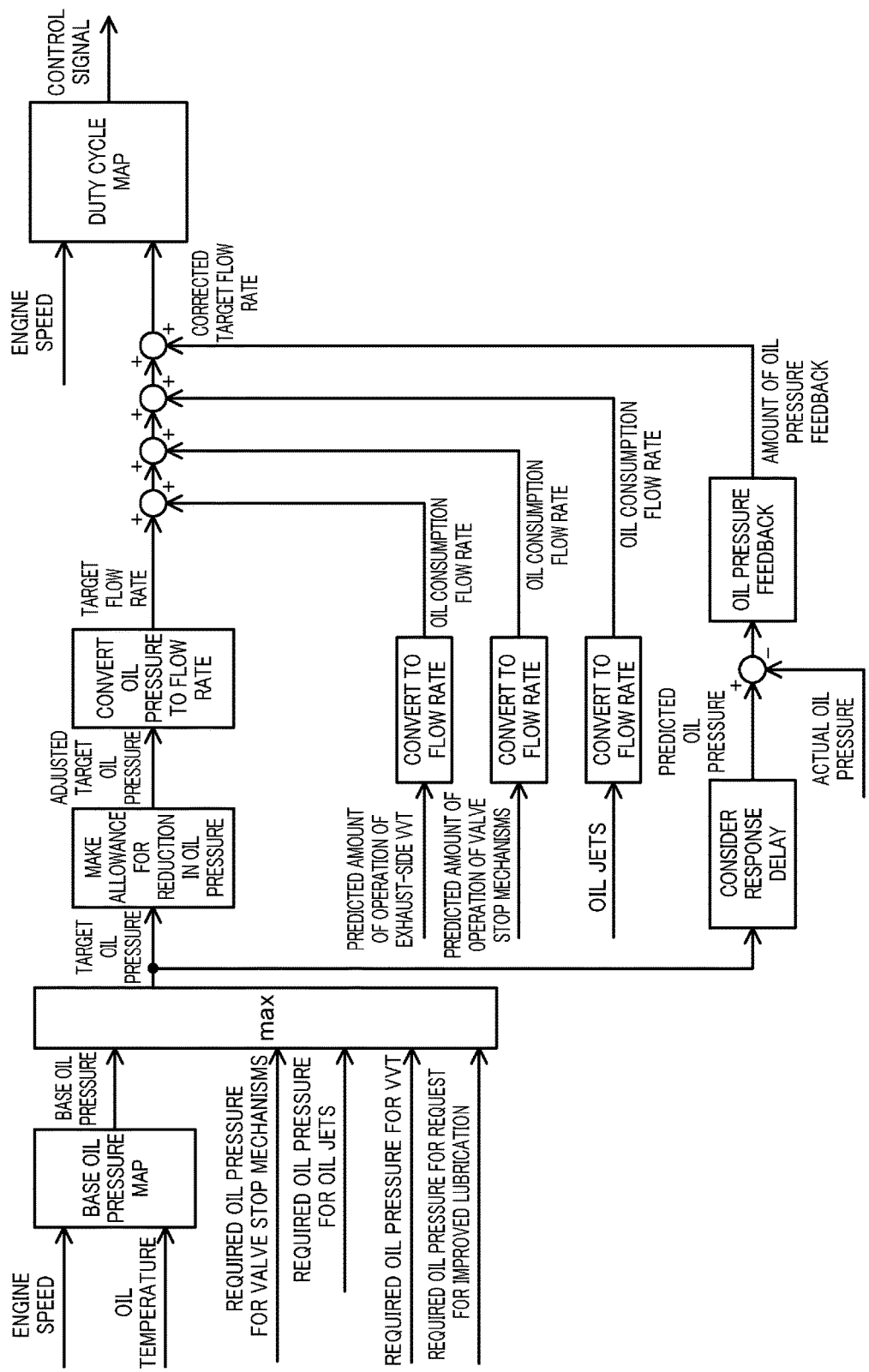
FIG. 9 is a block diagram of hydraulic control.

Hydraulic control in the hydraulic control system will be described with reference to FIG. 9. Hydraulic control is performed by controlling the flow rate (discharge amount) of the oil pump 81 by the controller 60.

The controller 60 obtained the base oil pressure from the base oil pressure map based on the rotational speed of the engine 100 and the oil temperature. The controller 60 also obtains the required oil pressures for the exhaust-side VVT 18, the valve stop mechanisms 45*d*, 46*d*, and the oil jets 71 and the required oil pressure at the time improved lubrication is requested from the corresponding maps. The controller 60 extracts the maximum value from the base oil pressure and the required oil pressures and sets the target oil pressure based on this maximum value.

The controller 60 then increases the target oil pressure based on allowance for reduction in oil pressure which occurs when oil flows from the oil pump 81 to the position of the oil pressure sensor 50*a*. The controller 60 thus calculates an adjusted target oil pressure. The allowance for reduction in oil pressure is stored in advance in the memory. The controller 60 converts the adjusted target oil pressure to the flow rate (discharge amount) of the oil pump 81 to obtain a target flow rate (target discharge amount).

Subsequently, the controller 60 corrects the target flow rate. Specifically, the controller 60 converts the predicted amount of operation of the exhaust-side VVT 18 for the case where the exhaust-side VVT 18 is operated to the flow rate to calculate the oil consumption flow rate at the time the exhaust-side VVT 18 is operated. The predicted amount of operation of the exhaust-side VVT 18 can be calculated from the difference between a current operating angle and a target operating angle and the rotational speed of the engine 100. The controller 60 converts the predicted amount of operation of the valve stop mechanisms 45d, 46d for the case where the valve stop mechanisms 45d, 46d are operated to the flow rate to calculate the oil consumption flow rate at the time the valve stop mechanisms 45d, 46d are operated. The controller 60 also calculates the oil consumption flow rate at the time the oil jets 71 are operated. The controller 60 calculates the oil consumption flow rate corresponding to the hydraulically operated device that is operated, and corrects the above target flow rate with the calculated oil consumption flow rate.

The controller 60 also corrects the target flow rate with the amount of oil pressure feedback (oil pressure feedback). When the discharge amount increases or decreases, the oil pressure (actual oil pressure) detected by the oil pressure sensor 50a follows a change in target oil pressure with a delay due to a response delay of the oil pump 81. A change in oil pressure due to such a response delay can be predicted by experiments etc., and the oil pressure thus predicted (predicted oil pressure) is set in advance in the memory. The controller 60 corrects the target flow rate with a value (amount of oil pressure feedback) according to the deviation between the predicted oil pressure and the actual oil pressure. The actual oil pressure can thus be smoothly controlled to the target oil pressure.

The controller 60 sets a target duty cycle from a duty cycle map based on the target flow rate thus corrected (corrected target flow rate) and the rotational speed of the engine 100, and sends a control signal to the oil control valve 84. The oil pump 81 thus discharges oil at a predetermined flow rate, so that the oil pressure in the hydraulic path (main gallery 50) is adjusted to the target oil pressure.

[Control of Number of Cylinders]

The engine 100 switches between the two operations according to the operating state of the engine 100, namely between all-cylinder operation in which all the cylinders (first to fourth cylinders) are operated to carry out combustion and cylinder cut-off operation in which a part of the cylinders (first and second cylinders) is stopped and combustion is carried out with the remainder (second and third cylinders).

Figure 10:
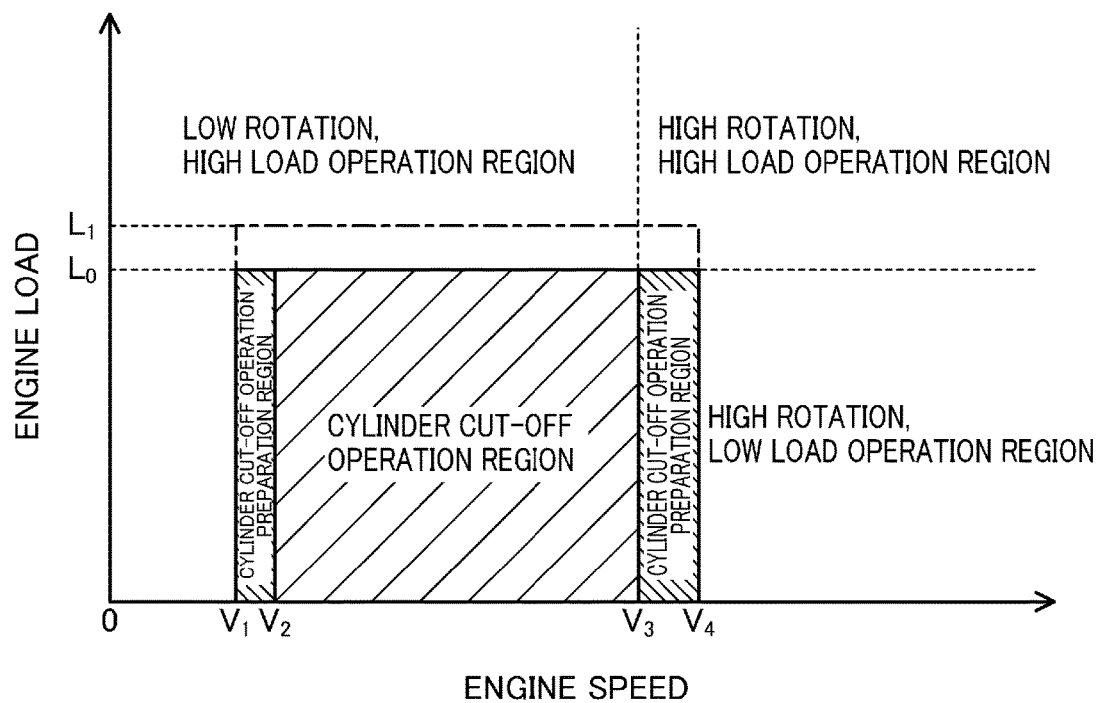
FIG. 10 is a graph showing cylinder cut-off operation regions.

Specifically, as shown in FIG. 10, cylinder cut-off operation is performed when the operating state of the engine 100 is in a cylinder cut-off operation region. Preparation for cylinder cut-off operation is made when the operating state of the engine 100 is in a cylinder cut-off operation preparation region provided adjacent to the cylinder cut-off operation region. All-cylinder operation is performed when the operating state of the engine 100 is located outside the cylinder cut-off operation region and the cylinder cut-off operation preparation region.

For example, in the case where the rotational speed of the engine 100 increases with the engine 100 being accelerated under a predetermined load (L0 or less), all-cylinder operation is performed when the rotational speed of the engine 100 is less than $V_1$, preparation for cylinder cut-off operation is made when the rotational speed of the engine 100 is in the range of $V_1$ to $V_2$, and cylinder cut-off operation is performed when the rotational speed of the engine 100 is $V_2$ or more. For example, in the case where the rotational speed of the engine 100 decreases with the engine 100 being decelerated under a predetermined load (L0 or less), all-cylinder operation is performed when the rotational speed of the engine 100 is $V_4$ or more, preparation for cylinder cut-off operation is made when the rotational speed of the engine 100 is in the range of $V_4$ to $V_3$, and cylinder cut-off operation is performed when the rotational speed of the engine 100 is $V_3$ or less.

Figure 11:
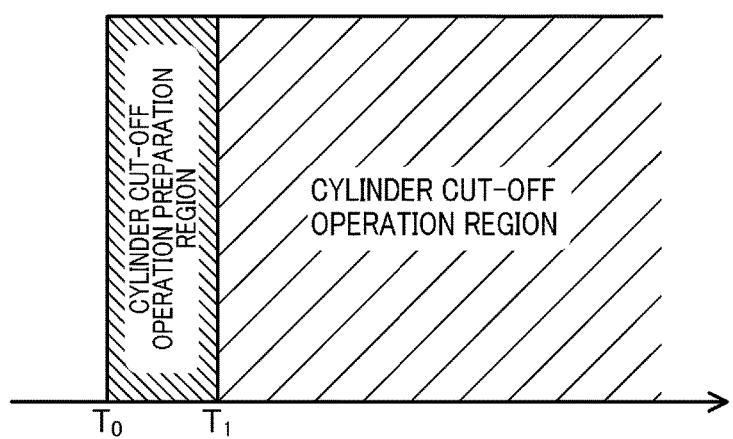
FIG. 11 is a graph showing a cylinder cut-off operation region.

As shown in FIG. 11, the engine 100 also switches between all-cylinder operation and cylinder cut-off operation according to the water temperature. In the case where the vehicle travels with the engine 100 being rotated at a predetermined rotational speed ($V_2$ or more and $V_3$ or less) under a predetermined load (L0 or less) and the water temperature increases due to warm-up of the engine 100, all-cylinder operation is performed when the water temperature is less than $T_0$, preparation for cylinder cut-off operation is made when the water temperature is in the range of $T_0$ to $T_1$, and cylinder cut-off operation is performed when the water temperature is $T_1$ or more.

In the cylinder cut-off operation preparation region, control of preliminarily increasing the oil pressure is performed in order to ensure an oil pressure (transient oil pressure) required to operate the valve stop mechanisms 45d, 46d (to press the lock pins 45g into the outer casing 45e). The engine 100 can thus quickly switch between all-cylinder operation and cylinder cut-off operation. As shown by an alternate long and short dash line in FIG. 10, a region located on the higher load side of the cylinder cut-off operation region may be a cylinder cut-off operation preparation region.

[Hydraulic Control during Cylinder Cut-Off Operation]

In cylinder cut-off operation, the valve stop mechanisms 45d, 46d need be in the unlocked state (the state where the lock pins 45g are pressed into the outer casing 45e against the biasing force of the lock spring 45h). Accordingly, in cylinder cut-off operation, a required oil pressure (also referred to as maintaining oil pressure) higher than that for all-cylinder operation is required in order to maintain the unlocked state, and this required oil pressure need be ensured in each valve stop mechanism 45d, 46d.

In the case where the timing to open and close the exhaust valves 14 is requested to be changed and the exhaust-side VVT 18 is operated during cylinder cut-off operation, pressurized oil is supplied to the advance chambers 18f and the retard chambers 18e of the exhaust-side VVT 18. This increases oil consumption and causes reduction in oil pressure in the hydraulic path (main gallery 50). The maintaining oil pressure therefore may not be able to be ensured.

In this respect, the invention of Japanese Unexamined Patent Publication No. 2015-194132 provides a solution to this problem in view of the fact that such reduction in oil pressure increases in proportion to the operating speed of the VVT. Specifically, the operating speed of the VVT is limited to ensure a necessary oil pressure. However, limiting the operating speed of the VVT may adversely affect operational performance during cylinder cut-off operation.

It is also possible to adjust the target oil pressure without limiting the operating speed of the VVT. Namely, the target oil pressure may be adjusted in view of the reduction in oil pressure which is caused by operation of the VVT. In this case, however, the target oil pressure need be set to a higher value in order to stably ensure the maintaining oil pressure. A decrease in fuel efficiency therefore cannot be avoided.

In this engine 100, the target oil pressure is adjusted in view of the reduction in oil pressure which is caused by operation of the exhaust-side VVT 18, and setting of the maintaining oil pressure is changed according to oil viscosity in order to restrain a decrease in fuel efficiency.

The second communicating passage 52, the oil filter 57a, the first direction control valve 96, etc. are present between the main gallery 50 that serves as the basis of hydraulic control such as adjustment of the target oil pressure and the exhaust-side VVT 18 for which the maintaining oil pressure is required. The path between the main gallery 50 and the exhaust-side VVT 18 is therefore long.

The oil temperature changes according to the operating state of the engine 100, and the oil viscosity changes with the oil temperature. As the viscosity of oil increases, fluidity thereof decreases, which increases pressure loss. Accordingly, as the oil viscosity increases, hydraulic control of the exhaust-side VVT 18 becomes less responsive. The maintaining oil pressure therefore may not be able to be temporarily ensured if the target oil pressure is set to a minimum required value in view of the reduction in oil pressure which is caused by operation of the exhaust-side VVT 18.

An additional map is therefore used in this engine 100. This map allows the required oil pressure (maintaining oil pressure) of the valve stop mechanisms 45d, 46d during cylinder cut-off operation to be set according to the oil temperature. Setting of the maintaining oil pressure is thus changed according to the oil viscosity. Accordingly, the maintaining oil pressure can be stably ensured even if the target oil pressure is set to a minimum required value in view of the reduction in oil pressure which is caused by operation of the exhaust-side VVT 18.

Figure 12:
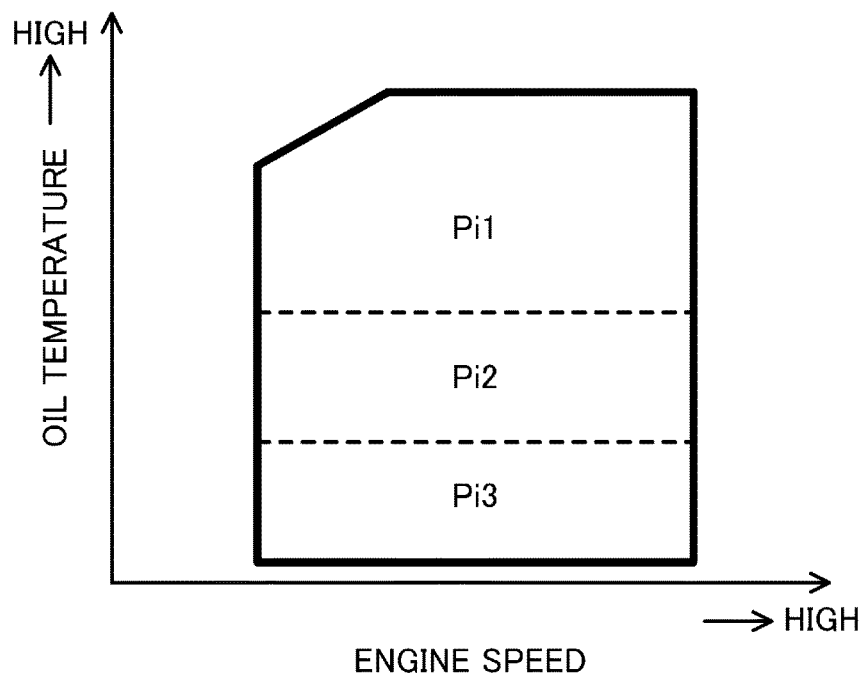
FIG. 12 shows a map of a maintaining oil pressure.

FIG. 12 shows this map (maintaining oil pressure map). The ordinate represents the oil temperature (° C.) detected by the oil temperature sensor 63 and the abscissa represents the engine speed (rpm). Pi1, Pi2, and Pi3 (Pi1<Pi2<Pi3) represent the required oil pressure (maintaining oil pressure (kPa)).

The oil viscosity changes with the oil temperature. The oil viscosity increases as the oil temperature decreases. This maintaining oil pressure map is therefore divided into a high temperature region, a medium temperature region, and a low temperature region, and the maintaining oil pressure corresponding to the oil temperature (viscosity) is set for each region. Specifically, a higher maintaining oil pressure is set for a lower oil temperature region. In other words, a higher maintaining oil pressure is set for a higher oil viscosity region.

The range of the engine speed is a relatively low speed range corresponding to cylinder cut-off operation. In this maintaining oil pressure map, the maintaining oil pressure in the same oil temperature region is constant even when the engine speed changes. Setting of each region etc. is shown simplified for convenience.

[Hydraulic Control When Switching from All-Cylinder Operation to Cylinder Cut-Off Operation]

As described above, in the cylinder cut-off operation preparation region, the control of preliminarily increasing the oil pressure is performed in order to ensure the oil pressure (transient oil pressure) required to operate the valve stop mechanisms 45d, 46d (operation of pressing the lock pins 45g into the outer casing 45e, also referred to as pin lock).

As in the exhaust-side VVT 18, the second communicating passage 52, the first oil supply passage 55 or the second oil supply passage 56, the second direction control valve 96 or the third direction control valve 98, etc. are present between the main gallery 50 and each valve stop mechanism 45d, 46d. The path between the main gallery 50 and each valve stop mechanism 45d, 46d is therefore long.

When switching from all-cylinder operation to cylinder cut-off operation, pin lock need be completed within a predetermined time according to operation of the exhaust valves 14. However, if the oil viscosity increases, hydraulic control of the valve stop mechanisms 45d, 46d becomes less responsive as in the case of the exhaust-side VVT 18. The pin lock therefore may not be able to be completed within the predetermined time.

Accordingly, an additional map is used which allows the required oil pressure (transient oil pressure) necessary for the pin lock to be set according to the oil temperature. Setting of the transient oil pressure is thus changed according to the oil viscosity. As a result, even when switching from all-cylinder operation to cylinder cut-off operation, the transient oil pressure can be stably ensured by setting the target oil pressure to a minimum required value.

Figure 13:
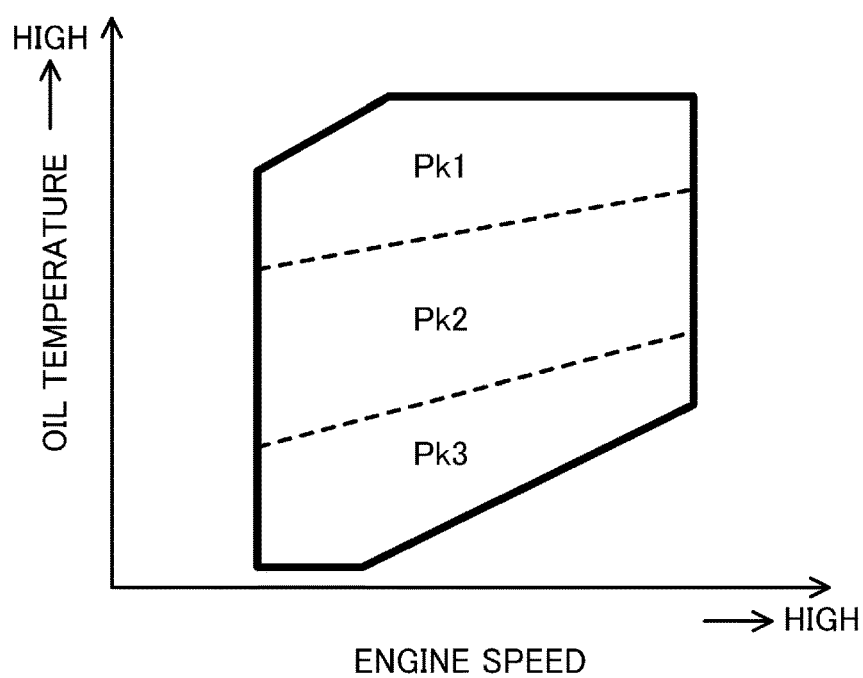
FIG. 13 shows a map of a transient oil pressure.

FIG. 13 shows this map (transient oil pressure map). As in the maintaining oil pressure map, the ordinate represents the oil temperature (° C.) detected by the oil temperature sensor 63 and the abscissa represents the engine speed (rpm). Pk1, Pk2, and Pk3 (Pk1<Pk2<Pk3) represent the required oil pressure (transient oil pressure).

As in the maintaining oil pressure map, the transient oil pressure map is also divided into a high temperature region, a medium temperature region, and a low temperature region, and the transient oil pressure corresponding to the oil temperature (viscosity) is set for each region. Specifically, a higher transient oil pressure is set for a higher oil viscosity region. The transient oil pressure is set to a higher value than the maintaining oil pressure (Pi1<Pk1, Pi2<Pk2, Pi3<Pk3).

Unlike the maintaining oil pressure map, in the transient oil pressure map, the transient oil pressure can be changed according to the engine speed. The operating speed of the exhaust valves 14 changes according to the rotational speed of the engine 100. Accordingly, the switching time is reduced as the engine speed increases. Hydraulic control of the valve stop mechanisms 45d, 46d therefore need be more responsive as the engine speed increases. In a high engine speed region, the transient oil pressure is therefore set to a high value relative to the oil viscosity.

[Flow of Hydraulic Control]

Figure 14:
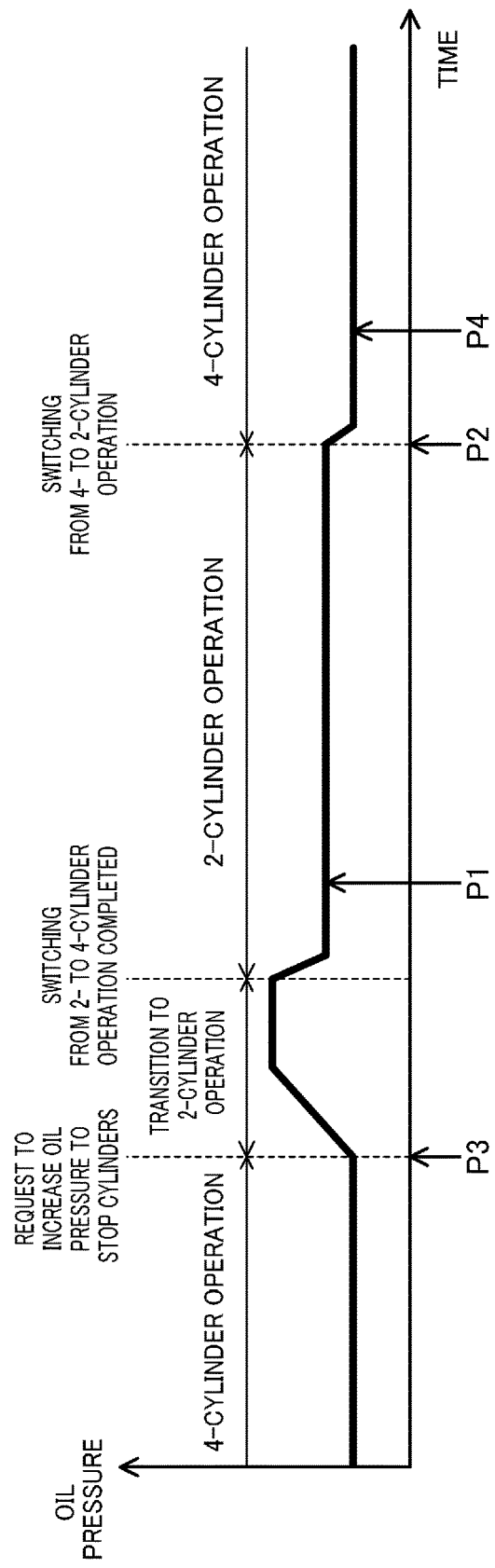
FIG. 14 is a timing chart showing a change in oil pressure with time.
Figure 15:
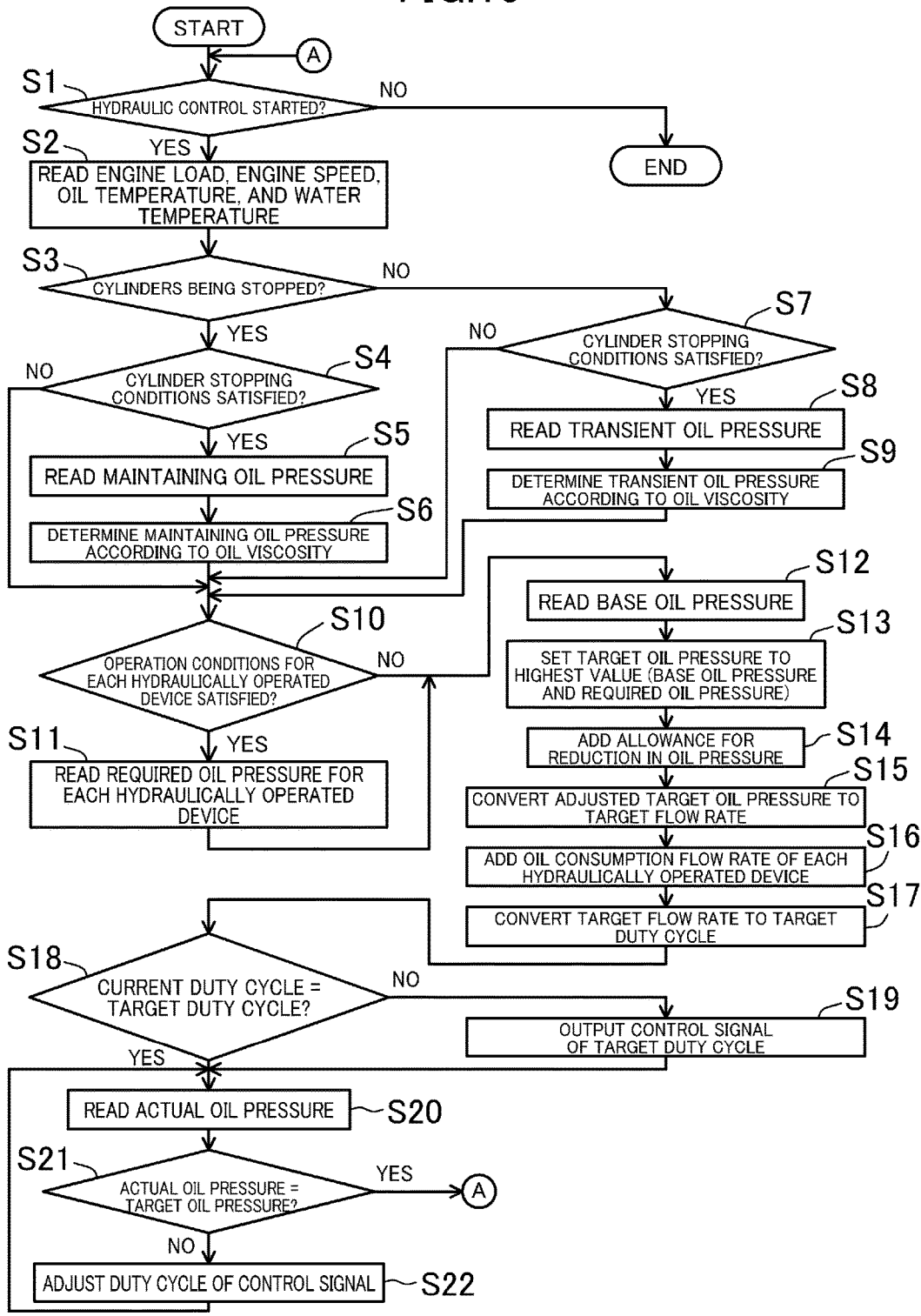
FIG. 15 is a flowchart of the hydraulic control.

Flow of the hydraulic control will be specifically described with reference to FIGS. 14 and 15. FIG. 14 is a timing chart showing a change in oil pressure (actual oil pressure) at the time the engine 100 is switched to cylinder cut-off operation. FIG. 15 is a flowchart of the hydraulic control.

The hydraulic control is started when the engine 100 is started (YES in step S1), and is terminated when the engine 100 is stopped (NO in step S1).

When the hydraulic control is started, the controller 60 reads the engine load, the engine speed, the oil temperature, and the water temperature in order to obtain the operational state of the engine 100 (step S2). The controller 60 then determines whether the first and fourth cylinders are being stopped or not, namely whether cylinder cut-off operation is being performed or not (step S3).

If it is determined that cylinder cut-off operation is being performed, the controller 60 determines whether cylinder stopping conditions are satisfied or not (step S4). If it is determined that the cylinder stopping conditions are satisfied (YES in step S4), namely if it is determined that cylinder cut-off operation need be continued, such as in the case where the current time is P1 in FIG. 14, the controller 60 reads from the maintaining oil pressure map the maintaining oil pressure corresponding to the current oil temperature, and determines the target oil pressure based on this maintaining oil pressure (steps S5, S6).

If it is determined that the cylinder stopping conditions are not satisfied (NO in step S4), namely if it is determined that the engine 100 need be switched from cylinder cut-off operation to all-cylinder operation, such as in the case where the current time is P2 in FIG. 14, steps S5, S6 are not performed, and the routine proceeds to the subsequent step.

If it is determined that the first and fourth cylinders are not being stopped, namely if it is determined that all-cylinder operation is being performed (NO in step S3), the controller 60 determines whether the cylinder stopping conditions are satisfied or not (step S7). If it is determined that the cylinder stopping conditions are satisfied (YES in step S7), namely if it is determined that the engine 100 need be switched to cylinder cut-off operation, such as in the case where the current time is P3 in FIG. 14, the controller 60 shifts the engine 100 to the cylinder cut-off operation preparation region and reads from the transient oil pressure map the transient oil pressure corresponding to the current oil temperature and the current engine speed, and determines the target oil pressure based on this transient oil pressure (steps S8, S9).

If it is determined that the cylinder stopping conditions are not satisfied (NO in step S7), namely if it is determined that all-cylinder operation need be continued, such as in the case where the current time is P4 in FIG. 14, steps S8, S9 are not performed, and the routine proceeds to the subsequent step.

Subsequently, the controller 60 determines whether operation conditions for each hydraulically operated device, namely the exhaust-side VVT 18, the valve stop mechanisms 45d, 46d, and the oil jets 71, and conditions for requesting improved lubrication are satisfied or not (step S10).

If the operation conditions for each hydraulically operated device and the conditions for requesting improved lubrication are not satisfied (NO in step S10), the controller 60 reads from the base oil pressure map the base oil pressure corresponding to the engine speed and the oil temperature (step S12).

If the operation conditions for each hydraulically operated device or the conditions for requesting improved lubrication are satisfied (YES in step S10), the controller 60 reads from the map the required oil pressure corresponding to each hydraulically operated device that satisfies the conditions or the required oil pressure for improved lubrication before step S12 (step S11).

Thereafter, the controller 60 compares the base oil pressure, the required oil pressure, the maintaining oil pressure, and the transient oil pressure and sets the target oil pressure based on the highest value of these pressures (step S13). The maintaining oil pressure or the transient oil pressure has the highest value during cylinder cut-off operation or when the engine 100 is switched to cylinder cut-off operation. In this case, the target oil pressure is therefore set to the maintaining oil pressure or the transient oil pressure.

Subsequently, the controller 60 adds the allowance for reduction in oil pressure to the target oil pressure to calculate an adjusted target oil pressure (step S14). The controller 60 converts the adjusted target oil pressure to the flow rate to calculate a target flow rate (target discharge amount) (step S15). The controller 60 also adds the oil consumption flow rate of each hydraulically operated device that is operated to correct the target flow rate (step S16).

The controller 60 sets a target duty cycle from the duty cycle map based on the corrected target flow rate (step S17). The controller 60 reads the duty cycle of a current control signal (hereinafter referred to as the "current duty cycle") and determines if the current duty cycle is equal to the target duty cycle (step S18).

If the current duty cycle is equal to the target duty cycle (YES in step S18), the controller 60 reads an actual oil pressure (step S20). If the current duty cycle is not equal to the target duty cycle (NO in step S18), the controller 60 outputs a control signal of the target duty cycle to the oil control valve 84 (step S19) and then reads an actual oil pressure.

The controller 60 then determines whether the actual oil pressure is equal to the target oil pressure or not (step S21). If the actual oil pressure is not equal to the target oil pressure (NO in step S21), the controller 60 adjusts the duty cycle of the control signal based on the deviation between the actual oil pressure and the target oil pressure (step S22), and repeats steps S20 to S22 until the actual oil pressure becomes equal to the target oil pressure. If the actual oil pressure is equal to the target oil pressure (YES in step S21), the controller 60 returns to the start of the hydraulic control and performs each of the above processes from step S1.

As described above, the engine 100 of the present embodiment is controlled by the hydraulic control system so that the maintaining oil pressure required to maintain the operated state of the valve stop mechanisms during cylinder cut-off operation is set to a high value in the high oil viscosity region. Accordingly, the maintaining oil pressure can be stably ensured even with a minimum required target oil pressure. Cylinder cut-off operation and operation of the exhaust-side VVT can thus be stably performed while restraining a decrease in fuel efficiency.

What is claimed is:

1. A hydraulic control system for an engine having a plurality of cylinders, comprising:
    a valve stop mechanism comprising a spring, the valve stop mechanism switches the engine from all-cylinder operation to cylinder cut-off operation in which the spring is compressed relative to the all-cylinder operation, when pressurized oil is supplied to the valve stop mechanism, the all-cylinder operation being an operation in which all of the cylinders are operated, and the cylinder cut-off operation being an operation in which a part of the cylinders is stopped;
    a variable valve timing mechanism having an advance chamber and a retard chamber, which are defined by a housing that rotates according to rotation of a crankshaft and a vane body that rotates with the camshaft and which change a phase angle of the camshaft with respect to the crankshaft when the pressurized oil is supplied to the advance chamber and the retard chamber, the variable valve timing mechanism being capable of changing a timing to open and close valves mounted in the cylinders during the all-cylinder operation and the cylinder cut-off operation;
    an oil pump that supplies the oil to hydraulically operated devices including the variable valve timing mechanism and the valve stop mechanism through a hydraulic path; and
    a control device that controls operation of the hydraulically operated devices and the oil pump, wherein
    the control device controls a maintaining oil pressure, which is required to maintain an operated state of the valve stop mechanism during the cylinder cut-off operation, so that the maintaining oil pressure is set to a high value in a high oil viscosity region.

2. The hydraulic control system according to claim 1, wherein the control device controls a transient oil pressure, which is required for operation of the valve stop mechanism when switching the engine from the all-cylinder operation to the cylinder cut-off operation, so that the transient oil pressure is set to a high value in the high oil viscosity region, and changes the transient oil pressure according to a rotational speed of the engine.

3. The hydraulic control system according to claim 2, wherein the oil pump is a variable oil pump whose discharge amount can be adjusted, and the hydraulic control system further comprising:

an oil pressure sensor mounted in the hydraulic path, wherein the hydraulic control system adjusts the discharge amount of the variable oil pump based on an oil pressure detected by the oil pressure sensor by adjusting the maintaining oil pressure and the transient oil pressure.

4. The hydraulic control system according to claim 1, wherein the oil pump is a variable oil pump whose discharge amount can be adjusted, and the hydraulic control system further comprising:

an oil pressure sensor mounted in the hydraulic path, wherein the hydraulic control system adjusts the discharge amount of the variable oil pump based on an oil pressure detected by the oil pressure sensor by adjusting the maintaining oil pressure and the transient oil pressure.

* * * * *